(12) United States Patent
Wang

(10) Patent No.: US 6,306,093 B1
(45) Date of Patent: Oct. 23, 2001

(54) METHOD AND SYSTEM FOR ULTRASOUND ENHANCED-RESOLUTION SPECTRAL DOPPLER

(75) Inventor: John S. Wang, Sunnyvale, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/087,048

(22) Filed: May 29, 1998

Related U.S. Application Data

(62) Division of application No. 08/861,630, filed on May 22, 1997, now Pat. No. 6,030,345.

(51) Int. Cl.[7] .................................................. A61B 8/00
(52) U.S. Cl. ............................................. 600/454; 600/455
(58) Field of Search .................................. 600/447, 455, 600/454, 441, 443

(56) References Cited

U.S. PATENT DOCUMENTS

| | | |
|---|---|---|
| 3,690,153 | 9/1972 | Matay . |
| 4,043,181 | 8/1977 | Nigam . |
| 4,176,658 | 12/1979 | Kossoff et al. . |
| 4,356,731 | 11/1982 | Mahoney . |
| 4,389,893 | 6/1983 | Ophir et al. . |
| 4,408,492 | 10/1983 | Kossoff et al. . |
| 4,441,368 | 4/1984 | Flax . |
| 4,452,085 | 6/1984 | Pelc et al. . |
| 4,470,303 | 9/1984 | O'Donnell . |
| 4,475,398 | 10/1984 | Tjornehoj et al. . |
| 4,475,400 | 10/1984 | Flax . |
| 4,513,621 | 4/1985 | Renzel et al. . |
| 4,559,952 | 12/1985 | Angelsen et al. . |
| 4,569,353 | 2/1986 | Ferrari . |
| 4,662,380 | 5/1987 | Riley . |
| 4,719,923 | 1/1988 | Hartwell et al. ...................... 600/454 |
| 4,751,846 | 6/1988 | Dousse . |
| 4,785,818 | 11/1988 | Hardin . |
| 4,786,818 | 11/1988 | Mead et al. . |
| 4,817,617 | 4/1989 | Takeuchi et al. . |
| 4,852,576 | 8/1989 | Inbar et al. . |
| 4,887,306 | 12/1989 | Hwang et al. . |
| 5,107,841 | 4/1992 | Sturgill . |
| 5,109,862 | 5/1992 | Kelen et al. ......................... 600/515 |
| 5,113,706 | 5/1992 | Pittaro . |
| 5,211,179 | 5/1993 | Harberi et al. ....................... 600/515 |
| 5,226,420 | 7/1993 | Peterson .............................. 600/455 |
| 5,249,548 | 10/1993 | Dupuy . |
| 5,271,404 | 12/1993 | Corl et al. . |
| 5,287,753 | 2/1994 | Routh et al. . |
| 5,301,168 | 4/1994 | Miller . |
| 5,301,670 | 4/1994 | Sato et al. . |

(List continued on next page.)

FOREIGN PATENT DOCUMENTS

| | | |
|---|---|---|
| 1329733 | 5/1963 | (FR) . |
| 1534366 | 12/1978 | (GB) . |

OTHER PUBLICATIONS

Claesson et al. "Frequency–And Depth–Dependent Compensation of Ultrasonic Signalsd," *IEEE Trans. on Ultrasonics, Ferro, and Freq. Control*, Sep. 1988.

(List continued on next page.)

*Primary Examiner*—Marvin M. Lateef
*Assistant Examiner*—Maulin Patel
(74) *Attorney, Agent, or Firm*—Craig A. Summerfield; Brinks Hofer Gilson & Lione

(57) ABSTRACT

A method and system for generating data for a spectral Doppler strip in an ultrasound system includes a beamformer that provides Doppler data to a signal processor. The signal processor applies an autoregressive model and determines autoregressive parameters responsive to the Doppler data. Information responsive to the autoregressive parameters is generated, and a window function is applied to the information. At least one spectrum responsive to the autoregressive parameter is estimated with a Fourier transform.

13 Claims, 2 Drawing Sheets

U.S. PATENT DOCUMENTS

| | | | |
|---|---|---|---|
| 5,301,674 | | 4/1994 | Erikson et al. . |
| 5,313,948 | | 5/1994 | Murashita et al. . |
| 5,419,331 | | 5/1995 | Parker et al. ............ 600/454 |
| 5,476,097 | | 12/1995 | Robinson . |
| 5,531,224 | | 7/1996 | Ellis et al. . |
| 5,609,158 | | 3/1997 | Chan ................. 600/518 |
| 5,642,732 | | 7/1997 | Wang . |
| 5,795,297 | * | 8/1998 | Diagle et al. ........... 600/447 |
| 5,800,356 | * | 9/1998 | Criton et al. ........... 600/441 |
| 6,030,345 | * | 2/2000 | Wang ................. 600/454 |

OTHER PUBLICATIONS

DeClercq, et al., Adaptive Gain Control for Dynamic Ultatsound Imaging, 1975, Ultrasonics Symposium Proceedings, pp. 59–63.

Janssen et al., "Adaptive Interpolation of Discrete–Time Signals That Can Be Modeled as Autoregressive Processes," *IEEE Trans. On Acoustics, Speech and Signal Processing*, Apr. 1986, pp. 317–330.

Kristoffersen et al., "A Time–Shared Ultrasound Doppler Measurement and 2–D Imaging System," *IEEE Trans. On Biomedical Engineering*, May 1988, pp. 285–295.

Kuc, "Ultrasonic Tissue Characterization Using Kurtosis," *IEEE Trans. On Ultrasonics, Ferro, and Freq. Control*, May 1986.

Ophir et al., "Digital Scan Converters in Diagnostic Ultrasound Imaging," *Proc. of the IEEE*, Apr., 1979, pp. 654–663.

\* cited by examiner

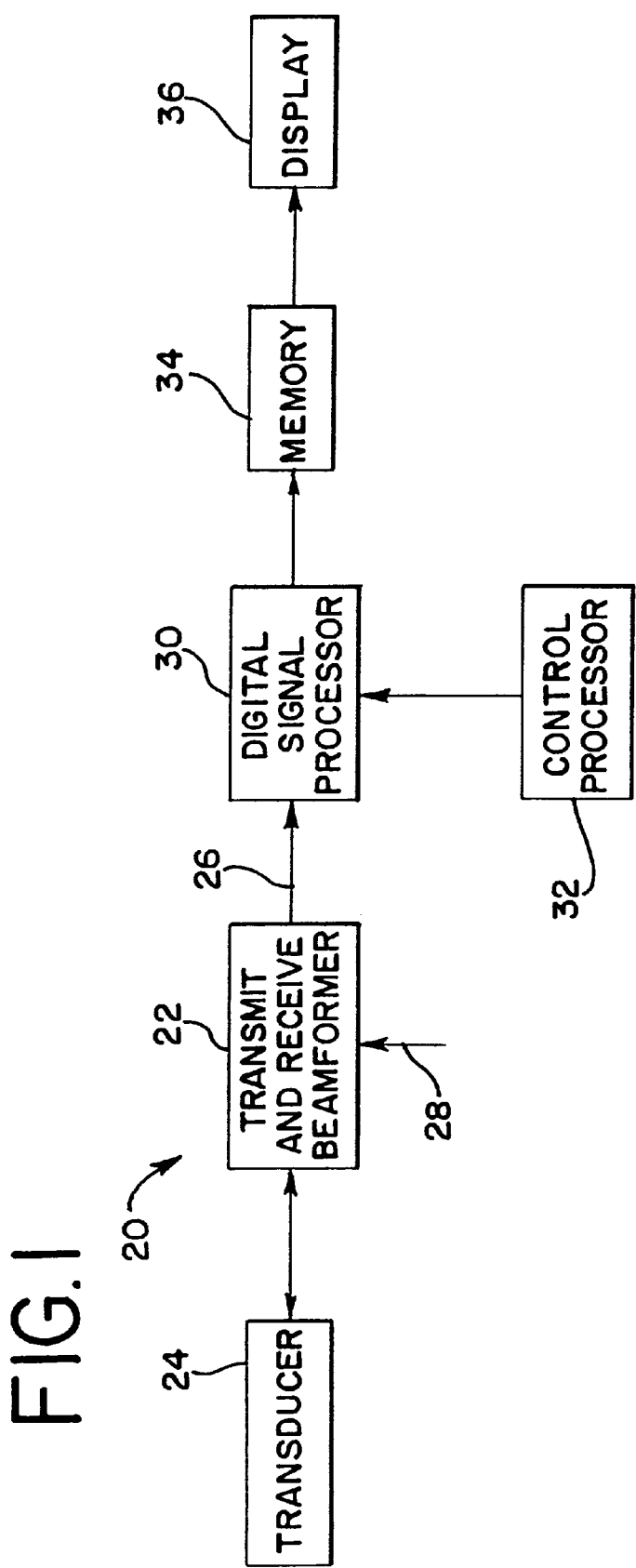

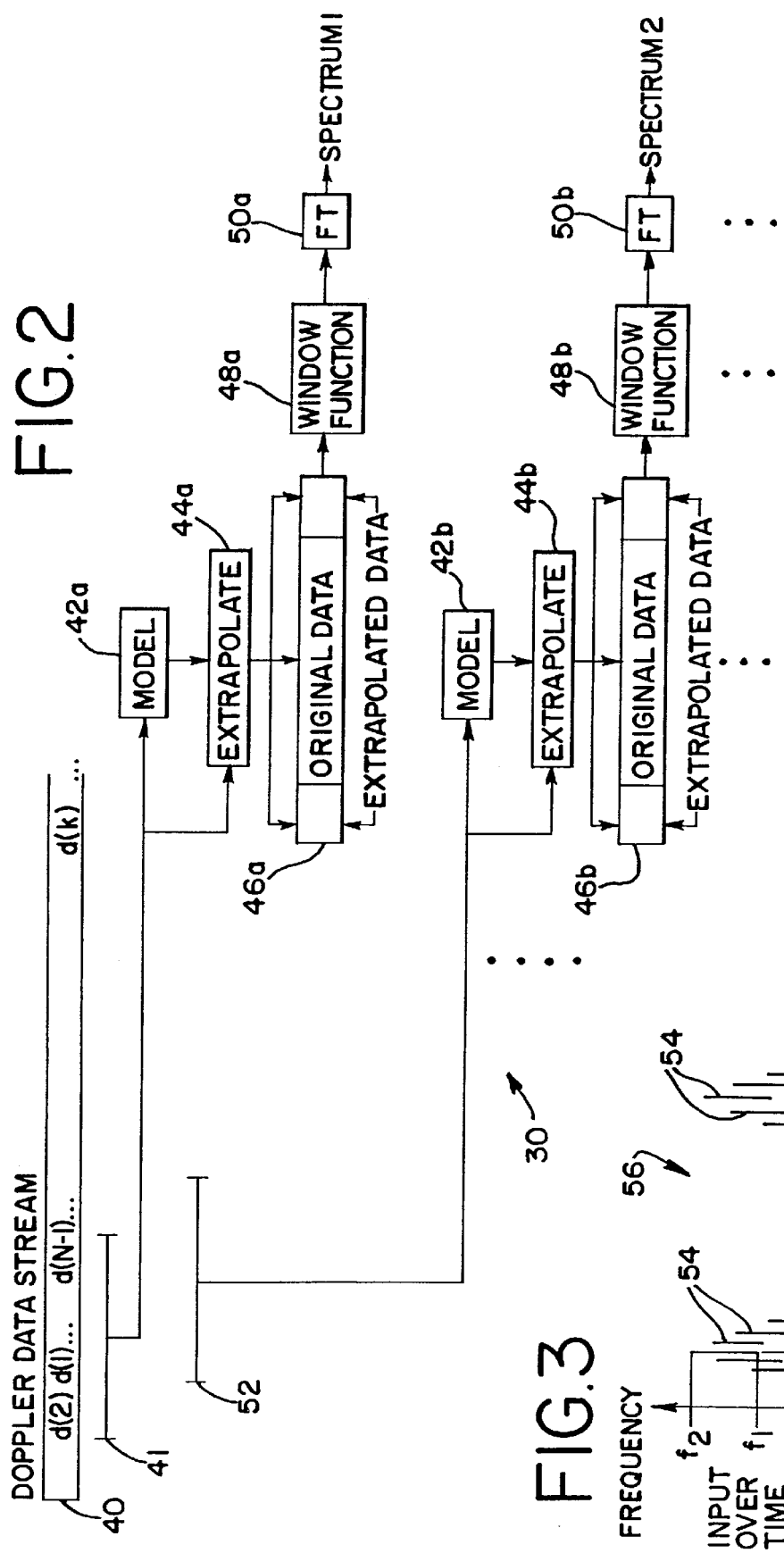

METHOD AND SYSTEM FOR ULTRASOUND ENHANCED-RESOLUTION SPECTRAL DOPPLER

This application is a division of U.S. Pat. No. 6,030,345, issued Feb. 29, 2000.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates in general to ultrasound systems and in particular to a system and method for generating spectral Doppler data.

BACKGROUND OF THE INVENTION

Ultrasound imaging systems detect and display information relating to Doppler shifts of returning echoes. The Doppler shifts represent movement, such as blood flow patterns. Spectral Doppler is one known ultrasound technique to detect and display blood flow patterns associated with a point or points in a body.

In spectral Doppler, an ongoing series of Doppler spectra are displayed for a particular point in the body. Each spectrum represents a point in time and a range of frequencies and associated signal strengths. The frequencies are proportional to blood flow velocities. The signal strength of each frequency is displayed on the spectrum as a brightness.

The spectrum is estimated by a signal processor. An ongoing stream of Doppler data samples is provided to the signal processor. The signal processor typically implements one of two methods for estimating spectra from the Doppler data.

One method to estimate each spectrum applies a conventional short-time Fourier transform (STFT) algorithm. In particular, a block of ongoing Doppler data is multiplied by a sliding window function. The Discrete Fourier Transform (DFT) of the output of the window function is computed. Generally, the DFT is based on a certain size or number of sample points, such as a 128 point DFT. The window function and the DFT function output the same number of sample points as are input. If the spectrum is displayed with more samples, then the samples are interpolated from the output of the DFT calculation.

The next spectrum is estimated using the same method on a different block of Doppler data. Generally, each spectrum is of the same size, such as a multiple point (128) spectrum. The different block of data is obtained by sliding or positioning the window function to operate on a block of Doppler data that includes at least one Doppler data sample obtained after the samples in the previous block of Doppler data. The sliding window is positioned based on a generally fixed time interval between each successive window.

The number of Doppler data samples used for calculating the spectrum varies based on the pulse repetition interval (PRI). The length of the window function, which determines the number of samples included in the block of Doppler samples, is varied between 32 and 128 samples as a function of the PRI. Varying the length of the window function prevents temporal resolution degradation as the PRI increases. Generally, the length of the window function is decreased as the PRI increases.

There are disadvantages to decreasing the length of the window. When the shorter window functions are used, data is interpolated from the estimated spectrum in order to output a certain size spectrum, such as a 128 point spectrum. By decreasing the window function size, the frequency resolution of the spectra is decreased. For example, a spectrum computed using a 32 sample window function has one quarter the frequency resolution of a spectrum computed using a 128 sample window function.

The second method to estimate each spectrum uses an autoregressive model. The ongoing Doppler data samples are modeled with an autoregressive model characterized by a set of autoregressive parameters. Using a z-transform, a spectral estimate is produced by computing the spectrum that corresponds to the autoregressive model. The autoregressive model generates spectra with improved frequency resolution as compared to the STFT based method described above. However, autoregressive models: (1) produce spectra with higher dynamic range than the conventional STFT method, (2) may not include spectral features due to poor approximation of the Doppler data, and (3) produce spectral strips with a different look than strips produced by conventional STFT methods.

Neither of the ultrasound systems and methods for estimating spectra is entirely satisfactory. It is therefore desirable to provide a method and system for enhanced-resolution spectral Doppler display.

SUMMARY OF THE INVENTION

The invention provides an efficient method for processing and displaying various ultrasound data. In one aspect, a method and system for generating data for a spectral Doppler strip in an ultrasound system are provided. A beamformer provides Doppler data to a signal processor. The signal processor applies an autoregressive model and determines autoregressive parameters responsive to the Doppler data. Information responsive to the autoregressive parameters is generated, and a window function is applied to the information.

In another embodiment, a method and system for generating data for a spectral Doppler strip in an ultrasound system are provided. A beamformer provides Doppler data to a signal processor. The signal processor generates extrapolated data from the Doppler data and applies a window function to the Doppler data and the extrapolated data.

In yet another aspect of the invention, a method for generating data for a spectral Doppler strip in an ultrasound system is provided. Doppler data is provided. Data is extrapolated from the Doppler data and a Fourier transform is applied to the Doppler data and the extrapolated data.

In another aspect of the invention, a method of estimating data for a spectral Doppler display in an ultrasound system is provided. At least one autoregressive parameter responsive to Doppler data is generated. At least one spectrum responsive to the auto-regressive parameter is estimated with a Fourier transform.

BRIEF DESCRIPTION OF THE DRAWINGS

FIG. 1 is a block diagram of an ultrasound system for creating a spectral Doppler display.

FIG. 2 is a pictorial representation of the method of generating data for the spectral Doppler display of FIG. 1.

FIG. 3 is a graphical representation of a spectral Doppler display.

DETAILED DESCRIPTION OF PREFERRED EMBODIMENTS

Referring now to the FIGURES, and in particular FIG. 1, a portion of an ultrasound system is generally shown at 20. Preferably, the ultrasound system 20 includes a spectral Doppler system, such as a pulse wave, continuous wave, or auxiliary continuous wave system, as known in the art. The spectral Doppler system includes a display of an ongoing series of estimated spectra. Preferably, each estimated spectrum includes a certain number of data points, such as 128. Furthermore, each spectrum includes the same number of data points as the other spectra. Generally, to estimate the spectra, spectral Doppler systems produce an ultrasonic wave, detect echo signals, process the echo signals, and display spectral information based on the echo signals.

To produce the ultrasonic wave, the ultrasound system 20 includes a transmit and receive beamformer 22. The transmit and receive beamformer 22 may comprise a transmit beamformer separate from the receive beamformer. As known in the art, the transmit and receive beamformer 22 produces one or more electrical excitation signals. The electrical excitation signals are applied to a transducer 24. The transducer 24 outputs an ultrasonic wave based on the electrical excitation signals into a body, such as a human body. The ultrasonic wave reflects off of structures within the body creating echo signals.

The echo signals are detected by the transducer 24. The detected echo signals are provided to the transmit and receive beamformer 22. The transmit and receive beamfofrmer 22 processes the echo signals and outputs a stream of Doppler data on line 26, as known in the art. Preferably, the stream of Doppler data is a stream of samples representing in phase (I) and quadrature (Q) components of the echo signal.

The ongoing Doppler data is represented mathematically as d(0), d(1), . . . d(K) where d(K) represents the Doppler data at time index K. The transmit and receive beamformer 22 provides the Doppler data samples with a sample period equal to the pulse repetition interval (PRI). Thus, the PRI is the amount of time between adjacent Doppler data samples. The PRI varies based on a PRI setting input 28 to the transmit and receive beamformer 22. The PRI is set as known in the art. For example, the user selects a frequency or velocity scale. Using a center frequency of the transducer 24, and the selected frequency or velocity scale, the ultrasound system 20 derives the minimum and maximum Doppler shift frequencies. The difference between the minimum and maximum Doppler shift frequencies is calculated. The PRI is set equal to one divided by the difference.

To process the echo signals, the Doppler data is provided to a signal processor 30. The signal processor 30 is preferably a commercially available digital signal processor, but other processors may be used. The signal processor 30 comprises a memory for storing various algorithms, such as the preferred algorithms discussed below. Additionally, the signal processor 30 may also comprise one or more look-up tables or one or more filters. The signal processor 30 receives the Doppler data on line 26 and control instructions from the control processor 32. The signal processor 30 processes the Doppler data in accordance with the algorithms to estimate a spectrum.

Attached as Appendix B is a preferred algorithm for generating spectra in accordance with the present invention using the MATLAB (version 5.0) simulation program by The Math Works, Inc. For implementation on an ultrasound system, the code may be altered.

Referring now to FIG. 2, the algorithm or algorithms applied by the signal processor 30 are pictorially represented. As discussed below in more detail, a set of Doppler data is selected and modeled. The parameters from the model are used to extrapolate additional samples from the set of Doppler data. A window function is applied to the set of Doppler data and the additional samples. A Fourier transform is performed on the output of the window function to estimate the spectrum.

As shown by the brackets 41, a set of Doppler data is selected. The Doppler data stream is shown as its mathematical representation at data block 40. The set is represented mathematically as d(0), d(1), . . . d(N-1). The number of Doppler data samples, N, included in the set is a function of the PRI. The PRI is input from the control processor 32 to the signal processor 30. As the PRI increases, the number of Doppler data samples selected decreases. Preferably, the number of samples of the Doppler data will range between approximately 32 to 128 samples, depending on the number of extrapolated data samples as discussed below. For example, the number of Doppler data samples selected is 32, 36, 40, 48, 56, 64, 80, 96, 112, or 128. Other ranges or size of the Doppler data sets may be used. The PRI values associated, respectively, with each of the number of Doppler data samples are 128 for the shortest PRI and approximately 32 for the largest PRI. The other numbers of Doppler data samples between 32 and 128 are associated with PRI values between the two PRI extremes discussed above. The association is based on testing and the system capabilities.

To model the selected data, the set of Doppler data samples is provided to model block 42. Model block 42 represents an autoregressive moving average (ARMA) function. Preferably, model block 42 represents an autoregressive model where the parameters of the autoregressive model are estimated using known autoregressive parameter estimators, such as an autocorrelation, covariance, or any other autoregressive parameter estimators. In particular, model block 42 represents a fourth-order autoregressive model with parameters estimated using the Burg algorithm. The autoregressive model is mathematically represented as:

$$y(N)=x(N)+a(1)\ y(N-1)+a(2)\ y(N-2)+\ldots a(P)\ y(N-P)$$

where x(N) represents a white noise signal, y(N) is an output of the model to approximate the signal d(N), P is the model order, and a(1), a(2), . . . a(P) are autoregressive coefficients determined by the model block 42. The model block 42 calculates autoregressive parameters, including autoregressive coefficients and the power of a white noise signal. The autoregressive parameters are determined from the set of Doppler data, as known in the art. In the preferred embodiment, the model block 42 outputs the four autoregressive coefficients, a(1), a(2), a(3), and a(4). More or fewer coefficients or other parameters may be determined. Further, the model block 42 may calculate a number of samples of approximate data, y(N), as replacement data for the set of Doppler data.

Based on the autoregressive coefficients and the set of Doppler data, the additional samples are extrapolated in an extrapolator 44. The extrapolator 44 represents an algorithm for extrapolating the additional data. The set of Doppler data samples is provided to the extrapolator 44. The extrapolator 44 also receives the autoregressive coefficients determined by the model block 42. To determine the number of samples of the additional data to extrapolate, the number of samples in the set of Doppler data or approximate data is subtracted from the number of samples to be included in the estimated spectrum, such as 128 minus 32. Preferably, the difference value is divided in half, such as 96 divided by 2. The one-half value, M, such as 48, represents the number of forward extrapolated samples and the number of backwards extrapolated samples of additional data. Thus, the number of Doppler or approximated data samples plus the number of additional data samples is equal to the number of points in the desired spectrum.

After determining the value of M, the Doppler data is extrapolated forward in time and backward in time. However, extrapolation may include only forward or only backward based data. The set of Doppler data d(0), d(1), . . . d(N−1) is extrapolated forward in time to obtain a set of extrapolated data. The forward extrapolated data is represented mathematically by d(N), d(N+1), . . . d(N+M−1). To obtain the extrapolated data, the autoregressive parameters are applied to the set of Doppler data, or alternatively, the set of approximate data. In particular, the extrapolated data is obtained by applying forward prediction equations, such as:

$$d(N)=a(1)\ d(N-1)+a(2)\ d(N-2)+\ldots a(P)\ d(N-P)$$

$$d(N+1)=a(1)\ d(N)+a(2)\ D(N-1)+\ldots a(P)\ d(N-P+1)$$

$$d(N+M-1)=a(1)\ d(N+M-2)+a(2)\ D(N+M-3)+\ldots a(P)\ d(N+M-P-1)$$

where a(1), a(2), . . . a(P) are the autoregressive coefficients determined by the model block 42. Other functions may be used.

The set of Doppler data is also preferably extrapolated backwards to create additional extrapolated data. In particular, autoregressive parameters are applied to the set of Doppler data or, alternatively, the set of approximate data, as discussed above. However, the autoregressive parameters applied for backward extrapolated data are not the autoregressive coefficients a(1), a(2) . . . a(P) discussed above. For backwards extrapolation, the autoregressive coefficients b(1), b(2) . . . b(P) are determined by the model block 42 as discussed above, only the set of Doppler data is reversed in order. For example, d(N−1) is the first value in the set and d(0) is the last value in the set used to determine the autoregressive parameters for backwards extrapolation. In the preferred autoregressive model for estimating parameters using the Burg algorithm, the backwards autoregressive parameters b(1), b(2) . . . b(P) correspond to the complex conjugate of the autoregressive parameters a(1), a(2) . . . a(P). The extrapolated data from the backwards in time extrapolation is calculated according to the following functions:

$$d(-1)=b(1)\ d(0)+b(2)\ d(1)+\ldots b(P)\ d(P-1)$$

$$d(-2)=b(1)\ d(-1)+b(2)\ d(0)+\ldots b(P)\ d(P-2)$$

$$d(-M)=b(1)\ D(-M+1)+b(2)\ (-M+2)+\ldots b(P)\ d(-M+P)$$

where b(N) is the complex conjugate of a(N). Other functions may be used.

The various extrapolated data is compiled together in a time sequence with either the set of approximate data or the set of Doppler data in a compilation block 46. Preferably, the number of samples compiled in the compilation block 46 is equal to the number of points for output as the desired spectrum. For example, 128 data samples are compiled together in the compilation block 46, such as 32 Doppler data samples and 48 extrapolated data samples from the forward prediction and 48 extrapolated data samples from the backwards prediction. Thus, the compiled data set e(N) is represented as d(−M+1), d(−M+2) . . . d(0), d(1) . . . d(N−1), d(N) . . . d(N+M−1) where N is 32 and M is 48. Alternatively, d(0) through d(N−1) is the set of values y(0), y(1), . . . y(N−1); d(−M+1) through d(−1) is the set of values y(−M+1), y(−M+2) . . . y(−1); and/or d(N) through d(N+M−1) is the set of values y(N), y(N+1) . . . y(N+M−1).

The compiled data set is provided to a window function block 48. The window function block 48 represents application of the window function to the compiled data set. Preferably, the window function is selected as a Blackman, Blackman-Harris, Hamming, or Acuson window function. The Blackman, Blackman-Harris and Hamming window functions are known in the art, as demonstrated in the article by Harris "On The Use Of Windows for Harmonic Analysis With The Discrete Fourier Transform", Proceedings of the IEEE, Volume 661, January 1978. The Acuson window is provided in Appendix A as the 128 weights of acuson128.

The control processor 32 selects the appropriate window function based on a look-up table. The control processor 32 receives input information from the user. For example, the user sets the scale, sharpness and/or Doppler mode for operation of the ultrasound system 20. Based on the input information from the user and a designation of the type of transducer 24, the control processor 32 controls selection of the type of window function as known in the art. The particular type of window function selected is based on user preferences. Each window function, as known in the art, provides adjustment of the frequency resolution and side lobe properties of the information output from the Fourier transform block 50. For example, application of the Acuson window results in information with larger side lobes, but better frequency resolution than application of the Blackman-Harris window.

The selected window function is applied by multiplying each of the samples in the compiled data set by a respective weight. The weights are selected to yield more appropriate values after performing a Fourier transform, as known in the art and discussed above. The size of the window function, such as a 128 sample window function, is selected by the control processor 32 to correspond with the number of samples in the set of compiled data (N+2M). In the preferred embodiment, the size of the window function is also equal to the number of points to be output from the signal processor 30 as the estimated spectrum. The output of the window function block 48 is a set of data with the same number of samples as input into the window function block 48.

The output of the window function block 48 is provided to the Fourier transform block 50. The Fourier transform block 50 represents application of a Fourier transform. Preferably, a discrete Fourier transform is applied to the set of data output by window function block 48. The Fourier transform is computed as a function of the number of samples. The appropriate sized Fourier transform algorithm is selected based on the number of samples input into the Fourier transform block 50, such as 128 samples. The size of the Fourier transform is selected by the control processor 32 to correspond with the number of samples, such as (N+2M), in the compiled data set, such as e(N). Application of the Fourier transform results in estimation of the spectrum. For example, a 128 sample spectrum is estimated.

The samples representing the estimated spectrum are log compressed, as known in the art. The complex spectrum information output by the Fourier transform block 50 is used to derive real values. In particular, the magnitude of the complex information is squared. As known in the art, the output of the log compression is based on the real values, a gain value and an amount of compression value. Thus, a log compressed estimated spectrum is derived.

After estimating one spectrum, another spectrum is estimated for the ongoing display of spectra. As represented by the duplicate set of function blocks 42–50 of FIG. 2, the signal processor 30 obtains another set of Doppler data as shown by a bracket 52. The first sample of the second or next Doppler data set is a fixed time interval from the first data sample of the first or preceding Doppler data set. Thus, the bracket 52 is shown shifted from the position of an earlier bracket 41. Preferably, the bracket shifts by the number of samples representing a certain amount of time. The amount of time is influenced by display considerations and is more than the time needed to process the prior set of Doppler data. For example, the first sample of the subsequent Doppler data set is d(10), a shift of ten samples. The shift of 10 samples corresponds to amount of time given by 10*PRI. This second set of Doppler data may contain values included in the first set of Doppler data. The second or next set of Doppler data is processed as discussed above. Thus, multiple ongoing spectra are calculated by the signal processor 30. Preferably, the signal processor 30 computes each spectrum serially, but parallel or pipeline processing may be used.

Other variations for calculating each spectrum are possible. For example, a 128 point spectrum is calculated using 32 Doppler data samples and 32 extrapolated data samples. The compiled set of data contains only 64 samples. A 64 sample window function is applied to the samples. Preferably, a Blackman, Blackman-Harris, Hamming or Acuson window function is used for any size window function. Window functions of various sizes are known in the art. The Acuson window function for various size windows is provided in Appendix A. After applying the window function, samples having a zero value are added as additional samples from the beginning and/or end of the set of data output from the window function block 48. Thus, the set of data output from the window function block 48 is zero extended. A total of 64 zero values are added, so that the total number of samples provided to the Fourier transform block 50 is 128. The 128 point spectrum is then estimated as discussed above.

As an alternative to zero extending the output of the window function, a 64 point spectrum is calculated by the Fourier transform block 50 on the 64 samples output from the window function block 48. Then, 64 additional samples are interpolated from the 64 point spectrum, as known in the art. Thus, a 128 point spectrum is provided. Other combinations of the number of samples at any point in the estimation process are possible.

The spectral information, such as the estimated spectrum, is displayed. Referring back to FIG. 1, the signal processor 30 provides the ongoing series of estimated spectra. Preferably, each spectrum includes the same number of sample points, such as 128. Each spectrum is passed through or stored in memory 34. Preferably, memory is a CINE as known in the art, but may be a buffer or other memory device. The memory 34 stores the estimated spectrum for later playback. As known in the art, the memory 34 outputs the spectral information for display either in a playback mode or in real time. The spectral information is scan converted and provided to the display 36. Each spectrum is displayed on display 36, as known in the art.

Each spectrum is displayed with other spectra. Referring to FIG. 3 and as known in the art, each spectrum 54 is used to create the spectral strip generally shown at 56. Each spectrum 54 represents the range of frequencies at a particular time. The particular time corresponds to the particular set of Doppler data used to estimate the spectrum 54. For example, the spectrum 54 displayed at time $t_1$ corresponds to the set of Doppler data samples d(0)–d(N−1) collected as shown by bracket 41 in FIG. 2. The range of frequencies are referenced to the vertical axis. The vertical axis may be a function of velocity instead of frequency, as known in the art. The number of frequencies in the range of frequencies corresponds to the number of points output for each spectrum by the signal processor 30. The signal strength associated with each particular frequency is displayed as a brightness on the spectrum 54. A high signal strength portion of the spectrum will correspond to a bright point on the spectrum 54.

It should be understood that many changes and modifications can be made to the embodiments described above. For example, different models, different autoregressive estimators, different window functions, and different extrapolation functions may be applied. Additionally, analog, digital or a combination of analog and digital processing may be used. Instead of using a digital signal processor, various structures implementing the functions described above may be used, such as a dedicated hardwired circuit or connection of discrete hardware components.

It is therefore intended that the foregoing detailed description be understood as an illustration of the presently preferred embodiments of the invention, and not as a definition of the invention. It is only the following claims, including all equivalents that are intended to define the scope of the invention.

Appendix A acuson128:

| | |
|---|---|
| 1.284711119949075465e-05 | 2.192049354362221388e-05 |
| 3.402967944084844115e-05 | 4.975539097135137052e-05 |
| 6.973476400403948324e-05 | 9.466068453715098107e-05 |
| 1.252803067962867734e-04 | 1.623927049792387497e-04 |
| 2.068456201378702976e-04 | 2.595312744680900938e-04 |
| 3.213812371257527135e-04 | 3.933603384624495157e-04 |
| 4.764596431224287247e-04 | 5.716885065826120054e-04 |
| 6.800657542568204006e-04 | 8.026100370133830691e-04 |
| 9.403294316508975905e-04 | 1.094210369310740817e-03 |
| 1.265205988724227057e-03 | 1.454224024544026155e-03 |
| 1.662114352741842806e-03 | 1.889656327125844616e-03 |
| 2.137546049404780331e-03 | 2.406383724287117481e-03 |
| 2.696661256848538468e-03 | 3.008750253853448818e-03 |
| 3.342890592921354213e-03 | 3.699179723461491157e-03 |
| 4.077562861063984724e-03 | 4.477824232488395763e-03 |
| 4.899579521520206324e-03 | 5.342269658015576852e-03 |
| 5.805156071326092286e-03 | 6.287317549765231335e-03 |
| 6.787648764208744322e-03 | 7.304860581524091727e-03 |
| 7.837482206478613503e-03 | 8.383865204299532914e-03 |
| 8.942189424704892475e-03 | 9.510470826902778924e-03 |
| 1.008657118192231306e-02 | 1.066820960521739671e-02 |
| 1.125297584909494379e-02 | 1.183834526148974317e-02 |
| 1.242169529526600778e-02 | 1.300032343089538474e-02 |
| 1.357146635535608908e-02 | 1.413232022172004713e-02 |
| 1.468006179742421986e-02 | 1.521187029491809402e-02 |
| 1.572494966647136963e-02 | 1.621655113561276326e-02 |
| 1.668399573111698300e-02 | 1.712469658578743073e-02 |
| 1.753618076158327752e-02 | 1.791611036495513107e-02 |
| 1.826230272158399850e-02 | 1.857274938802176353e-02 |
| 1.884563378892229260e-02 | 1.907934728250323952e-02 |
| 1.927250347342157610e-02 | 1.942395061117493937e-02 |
| 1.953278193321537209e-02 | 1.959834383490775475e-02 |
| 1.962024177298294508e-02 | 1.959834383489990686e-02 |
| 1.953278193319972836e-02 | 1.942395061115160040e-02 |
| 1.927250347339068762e-02 | 1.907934728246498540e-02 |
| 1.884563378887691223e-02 | 1.857274938796953448e-02 |
| 1.826230272152522954e-02 | 1.791611036489017955e-02 |
| 1.753618076151253549e-02 | 1.712469658571131453e-02 |
| 1.668399573103593672e-02 | 1.621655113552724833e-02 |
| 1.572494966638186831e-02 | 1.521187029482510764e-02 |
| 1.468006179732825843e-02 | 1.413232022162162066e-02 |
| 1.357146635525572145e-02 | 1.300032343079358596e-02 |
| 1.242169529516328440e-02 | 1.183834526138658610e-02 |
| 1.125297584899184050e-02 | 1.066820960511480863e-02 |
| 1.008657118182068949e-02 | 9.510470868802534458e-03 |
| 8.942189424606420897e-03 | 8.383865204203200250e-03 |
| 7.837482206384754554e-03 | 7.304860581433013540e-03 |
| 6.787648764120713177e-03 | 6.287317549680485756e-03 |
| 5.805156071244833502e-03 | 5.342269656723973130e-03 |
| 4.899579521446817409e-03 | 4.477824324218470794e-03 |
| 4.077562860998015792e-03 | 3.699179723399513824e-03 |
| 3.342890592863375851e-03 | 3.008750253799448611e-03 |
| 2.696661256798465241e-03 | 2.406383724240900544e-03 |

A-1

|  |  |
|---|---|
| 2.137546049362322106e-03 | 1.889656327087030395e-03 |
| 1.662114352706541400e-03 | 1.454224045512087944e-03 |
| 1.265205988713690713e-03 | 1.094210369285035468e-03 |
| 9.403294316280435845e-04 | 8.026100369931956583e-04 |
| 6.800657542391122350e-04 | 5.716885065671921569e-04 |
| 4.764596431091088673e-04 | 3.933603384510422993e-04 |
| 3.213812371160764260e-04 | 2.595312744599683895e-04 |
| 2.068456201311323064e-04 | 1.623927049737222748e-04 |
| 1.252803067918388611e-04 | 9.466068453362805584e-05 |
| 6.973476400130843218e-05 | 4.975539096929000403e-05 |
| 3.402967943934467985e-05 | 2.192049354257530149e-05 | acuson112:

|  |  |
|---|---|
| 4.020931654653300504e-05 | 6.509858246348569296e-05 |
| 9.719588403993112381e-05 | 1.376307664929253593e-04 |
| 1.876000840766634708e-04 | 2.483600380560483170e-04 |
| 3.212166799305350880e-04 | 4.075149102894577323e-04 |
| 5.086260290294461429e-04 | 6.259339183887683124e-04 |
| 7.608199659344914989e-04 | 9.146468598434081415e-04 |
| 1.088741413106470097e-03 | 1.284376596218813954e-03 |
| 1.502752979060998501e-03 | 1.744979801615301499e-03 |
| 2.012055909500878696e-03 | 2.304850803691346327e-03 |
| 2.624086063874401728e-03 | 2.970317411446943019e-03 |
| 3.343917680883246989e-03 | 3.745060966997114035e-03 |
| 4.173708210330981730e-03 | 4.629594473499800897e-03 |
| 5.112218147815177603e-03 | 5.620832312004228094e-03 |
| 6.154438443473621463e-03 | 6.711782657572274952e-03 |
| 7.291354621993559847e-03 | 7.891389262042461036e-03 |
| 8.509871338740241167e-03 | 9.144542945473734322e-03 |
| 9.792913931374091011e-03 | 1.045227522073713389e-02 |
| 1.111971495849852463e-02 | 1.179213737250096004e-02 |
| 1.246628420466175738e-02 | 1.313875852575879105e-02 |
| 1.380605071298627272e-02 | 1.446456633625527698e-02 |
| 1.511065566896442960e-02 | 1.574064451214341256e-02 |
| 1.635086599792881512e-02 | 1.693769301966611268e-02 |
| 1.749757092180021501e-02 | 1.802705007418863026e-02 |
| 1.852281794914107868e-02 | 1.898173032507699184e-02 |
| 1.940084124143578309e-02 | 1.977743134549458590e-02 |
| 2.010903428611962585e-02 | 2.039346083160156059e-02 |
| 2.062882041472166236e-02 | 2.081353983851567252e-02 |
| 2.094637891034638669e-02 | 2.102644280938632468e-02 |
| 2.105319103291610275e-02 | 2.102644280938479812e-02 |
| 2.094637891034335092e-02 | 2.081353983851114142e-02 |
| 2.062882041471567410e-02 | 2.039346083159415332e-02 |
| 2.010903428611085855e-02 | 1.977743134548451756e-02 |
| 1.940084124142448657e-02 | 1.898173032506454347e-02 |
| 1.852281794912756865e-02 | 1.802705007417413838e-02 |
| 1.749757092186485924e-02 | 1.693769301964998322e-02 |
| 1.635086599791201259e-02 | 1.574064451212605492e-02 |
| 1.511065566894662093e-02 | 1.446456633623712483e-02 |
| 1.380605071296788292e-02 | 1.313875852574027288e-02 |
| 1.246628420464321839e-02 | 1.179213737248249565e-02 |
| 1.111971495848022851e-02 | 1.045227522071909797e-02 |
| 9.792913931356398566e-03 | 9.144542945456466884e-03 |
| 8.509871338723466391e-03 | 7.891389262026243107e-03 |
| 7.291354621977957744e-03 | 6.711782657560336381e-03 |
| 6.154438443459383720e-03 | 5.620832311990728476e-03 |
| 5.112218147802436927e-03 | 4.629594473487837376e-03 |
| 4.173708210319806641e-03 | 3.745060966986727812e-03 |
| 3.343917680873648331e-03 | 2.970317411438119348e-03 |

| | |
|---|---|
| 2.624086063866339167e-03 | 2.304850803684021891e-03 |
| 2.012055909494268099e-03 | 1.744979801609374166e-03 |
| 1.502752979055721472e-03 | 1.284376596214149933e-03 |
| 1.088741413102380920e-03 | 9.146468598398553194e-04 |
| 7.608199659314329646e-04 | 6.259339183861613483e-04 |
| 5.086260290272504167e-04 | 4.075149102876328574e-04 |
| 3.212166799290401900e-04 | 2.483600380548444189e-04 |
| 1.876000840757141163e-04 | 1.376307664921959893e-04 |
| 9.719588403938759971e-05 | 6.509858246309830753e-05 |
| 4.020931654627303369e-05 | | acuson96:

| | |
|---|---|
| 5.999614011658058942e-05 | 1.006850595479132201e-04 |
| 1.541723770527897886e-04 | 2.225816580243924776e-04 |
| 3.081493766826323179e-04 | 4.132014159053951151e-04 |
| 5.401257130162571713e-04 | 6.913412749492627322e-04 |
| 8.692638735480891178e-04 | 1.076268817304222147e-03 |
| 1.314651277660131229e-03 | 1.585847241697721150e-03 |
| 1.894078091442450394e-03 | 2.238923360116130393e-03 |
| 2.622697282471251039e-03 | 3.046629019246095520e-03 |
| 3.511649476509704024e-03 | 4.018308139102397085e-03 |
| 4.566747189464974432e-03 | 5.156670677251013434e-03 |
| 5.787318465882177083e-03 | 6.457445627428626440e-03 |
| 7.165307887478303620e-03 | 7.908653637934831560e-03 |
| 8.684722939210352474e-03 | 9.490253825613312669e-03 |
| 1.032149611070201992e-02 | 1.117423276505347118e-02 |
| 1.204380880955350196e-02 | 1.292516753537483430e-02 |
| 1.381289372980611975e-02 | 1.470126345761336648e-02 |
| 1.558429982324066425e-02 | 1.645583402241930504e-02 |
| 1.730957088507259836e-02 | 1.813915801703281511e-02 |
| 1.893825756806887320e-02 | 1.970061958983933964e-02 |
| 2.042015590111614931e-02 | 2.109101335011384290e-02 |
| 2.170764535578836169e-02 | 2.226488062193399467e-02 |
| 2.275798794980837814e-02 | 2.318273612645285406e-02 |
| 2.353544793605584148e-02 | 2.381304742945482625e-02 |
| 2.401309969065441863e-02 | 2.413384245719111046e-02 |
| 2.417420908114591149e-02 | 2.413384245719076351e-02 |
| 2.401309969065371780e-02 | 2.381304742945379235e-02 |
| 2.353544793605447105e-02 | 2.318273612645117138e-02 |
| 2.275798794980639361e-02 | 2.226488062193172218e-02 |
| 2.170764535578582552e-02 | 2.109101335011107081e-02 |
| 2.042015590111315865e-02 | 1.970061958983616163e-02 |
| 1.893825756806553212e-02 | 1.813915801702933872e-02 |
| 1.730957088506901095e-02 | 1.645583402241564477e-02 |
| 1.558429982323695714e-02 | 1.470126345760963682e-02 |
| 1.381289372980239530e-02 | 1.292516753537113934e-02 |
| 1.204380880954986598e-02 | 1.117423276504991327e-02 |
| 1.032149611069856088e-02 | 9.490253825609971591e-03 |
| 8.684722939207143236e-03 | 7.908653637931766303e-03 |
| 7.165307887475400560e-03 | 6.457445627425890781e-03 |
| 5.787318465879617499e-03 | 5.156670677248634260e-03 |
| 4.566747189462774803e-03 | 4.018308139100381336e-03 |
| 3.511649476507868253e-03 | 3.046629019244436257e-03 |
| 2.622697282469764381e-03 | 2.238923360114808534e-03 |
| 1.894078091441285311e-03 | 1.585847241688754734e-03 |
| 1.314651277659253242e-03 | 1.076268817303472312e-03 |
| 8.692638735474567026e-04 | 6.913412749487366773e-04 |
| 5.401257130158270683e-04 | 4.132014159050499051e-04 |
| 3.081493766823602373e-04 | 2.225816580241839313e-04 |
| 1.541723770526354524e-04 | 1.006850595478037699e-04 |

A-3

5.999614011650721603e-05 acuson80:

| | |
|---|---|
| 5.488371452651305354e-05 | 1.039397490599729525e-04 |
| 1.732679894054422933e-04 | 2.673351015133674288e-04 |
| 3.909619200245409258e-04 | 5.492551523884254484e-04 |
| 7.475224426549987320e-04 | 9.911716106376510134e-04 |
| 1.285595447034753019e-03 | 1.636044006533538811e-03 |
| 2.047486877749938542e-03 | 2.524468403247220535e-03 |
| 3.070959254989133382e-03 | 3.690208123032187679e-03 |
| 4.384597532118898050e-03 | 5.155507948767127507e-03 |
| 6.003194370201187305e-03 | 6.926679489337745493e-03 |
| 7.923667304247072538e-03 | 8.990480687443302282e-03 |
| 1.012202595566023995e-02 | 1.131178689429537115e-02 |
| 1.255185000631403418e-02 | 1.383296199062084703e-02 |
| 1.514461963042303128e-02 | 1.647519141119729164e-02 |
| 1.781206931564932941e-02 | 1.914184838708442651e-02 |
| 2.045053082552883775e-02 | 2.172375067041892524e-02 |
| 2.294701438880751565e-02 | 2.410595223965083730e-02 |
| 2.518657479482905998e-02 | 2.617552877003686759e-02 |
| 2.706034619905602415e-02 | 2.782968104097721662e-02 |
| 2.847352752877509510e-02 | 2.898341494640408258e-02 |
| 2.935257405103142841e-02 | 2.957607102315946285e-02 |
| 2.965090561187330026e-02 | 2.957607102316611725e-02 |
| 2.935257405104465048e-02 | 2.898341494642366761e-02 |
| 2.847352752880077595e-02 | 2.782968104100863593e-02 |
| 2.706034619909273090e-02 | 2.617552877008835177e-02 |
| 2.518657479487476994e-02 | 2.410595223970015549e-02 |
| 2.294701438885980715e-02 | 2.172375067047352393e-02 |
| 2.045053082558507748e-02 | 1.914184838576564462e-02 |
| 1.781206931570687019e-02 | 1.647519141125454098e-02 |
| 1.514461963047940285e-02 | 1.383296199067580827e-02 |
| 1.255185000636710457e-02 | 1.131178689434612743e-02 |
| 1.012202595570832822e-02 | 8.990480687488431114e-03 |
| 7.923667304289023355e-03 | 6.926679489376361305e-03 |
| 6.003194370236384844e-03 | 5.155507948798882488e-03 |
| 4.384597532147239962e-03 | 3.690208123057204994e-03 |
| 3.070959255010957505e-03 | 2.524468403266019300e-03 |
| 2.047486877765912310e-03 | 1.636044006546913312e-03 |
| 1.285595447045768946e-03 | 9.911716106465612037e-04 |
| 7.475224426620555871e-04 | 5.492551523862978201e-04 |
| 3.909619200286369332e-04 | 2.673351015163334806e-04 |
| 1.732679894074904054e-04 | 1.039397490612967498e-04 |
| 5.488371452728454470e-05 | | acuson64:

| | |
|---|---|
| 6.070306734636367259e-05 | 1.324851667255545621e-04 |
| 2.431489142812893729e-04 | 4.038499397999187291e-04 |
| 6.268935803430925957e-04 | 9.254555048479530966e-04 |
| 1.313216192780031384e-03 | 1.803915398207287359e-03 |
| 2.410837507357090244e-03 | 3.146243342835829560e-03 |
| 4.020768214175280027e-03 | 5.042809599556991387e-03 |
| 6.217930524816868768e-03 | 7.548306275766256471e-03 |
| 9.032242380246616534e-03 | 1.066379072970694702e-02 |
| 1.243248824836703202e-02 | 1.432323870738414287e-02 |
| 1.631635324309845328e-02 | 1.838775906512486041e-02 |
| 2.050937898823233796e-02 | 2.264967710004888932e-02 |
| 2.477435843000237031e-02 | 2.684720327816809277e-02 |
| 2.883101026045114049e-02 | 3.068861647360855011e-02 |
| 3.238395878587472382e-02 | 3.388313736586560931e-02 |

A-4

| | |
|---|---|
| 3.515544135242464063e-02 | 3.617429713753894660e-02 |
| 3.691810209115744396e-02 | 3.737091061800584813e-02 |
| 3.752294503236097006e-02 | 3.737091061800022762e-02 |
| 3.691810209114630009e-02 | 3.617429713752255693e-02 |
| 3.515544135240337292e-02 | 3.388313736583993541e-02 |
| 3.238395878584521270e-02 | 3.068861647357581934e-02 |
| 2.883101026041588397e-02 | 2.684720327813100438e-02 |
| 2.477435842996418211e-02 | 2.264967710001028825e-02 |
| 2.050937898819400057e-02 | 1.838775906508739733e-02 |
| 1.631635324306240573e-02 | 1.432323870734998443e-02 |
| 1.243248824833514954e-02 | 1.066379072967762326e-02 |
| 9.032242380220057917e-03 | 7.548306275742574026e-03 |
| 6.217930524796090250e-03 | 5.042809599539066490e-03 |
| 4.020768214160091655e-03 | 3.146243342823205977e-03 |
| 2.410837507346819814e-03 | 1.803915398199122883e-03 |
| 1.313216192773710052e-03 | 9.254555048432102542e-04 |
| 6.268935803396602285e-04 | 4.038499397975475790e-04 |
| 2.431489142797463093e-04 | 1.324851667246344810e-04 | acuson56:

| | |
|---|---|
| 9.822616239639920263e-05 | 2.195800889034696911e-04 |
| 4.087521932582560973e-04 | 6.850846571050194607e-04 |
| 1.069407177093777877e-03 | 1.583297834976441941e-03 |
| 2.248176963080205596e-03 | 3.084264044947819527e-03 |
| 4.109395428391897186e-03 | 5.338063834102031030e-03 |
| 6.779813357115217591e-03 | 8.438598911708885750e-03 |
| 1.031163228875613125e-02 | 1.238870468896351162e-02 |
| 1.465173364570366774e-02 | 1.707462456729485697e-02 |
| 1.962347899956509711e-02 | 2.225716496390351892e-02 |
| 2.492824614249783757e-02 | 2.758424731174922984e-02 |
| 3.016921441070335649e-02 | 3.262551013774048908e-02 |
| 3.489577110357244133e-02 | 3.692494130885267539e-02 |
| 3.866228983910239420e-02 | 4.006331870289211311e-02 |
| 4.109146991246588609e-02 | 4.171954913646160751e-02 |
| 4.193079614568147317e-02 | 4.171954913644879137e-02 |
| 4.109146991244063546e-02 | 4.006331870285514268e-02 |
| 3.866228983905473787e-02 | 3.692494130879565156e-02 |
| 3.489577110350759043e-02 | 3.262551013766951807e-02 |
| 3.016921441062805562e-02 | 2.758424731167142402e-02 |
| 2.492824614241931011e-02 | 2.225716496382593862e-02 |
| 1.962347899948999053e-02 | 1.707462456722353902e-02 |
| 1.465173364563722436e-02 | 1.238870468890276508e-02 |
| 1.031163228870165052e-02 | 8.438598911660974422e-03 |
| 6.779813357073948520e-03 | 5.338063834067248090e-03 |
| 4.109395428105546838e-03 | 3.084264044924846151e-03 |
| 2.248176963062304117e-03 | 1.583297834962947310e-03 |
| 1.069407177084000541e-03 | 6.850846709827398884e-04 |
| 4.087521932538909367e-04 | 2.195800889008945483e-04 |
| 9.822616239509409427e-05 | | acuson48:

| | |
|---|---|
| 1.104949698311284538e-04 | 2.746422596882733443e-04 |
| 5.480050482527330357e-04 | 9.672101423873574700e-04 |
| 1.571981036041188986e-03 | 2.403123377143118015e-03 |
| 3.500019425538659044e-03 | 4.897754981733149458e-03 |
| 6.624050392207639880e-03 | 8.696205471373556761e-03 |
| 1.111829204691948229e-02 | 1.387883386744546282e-02 |
| 1.694919976050677374e-02 | 2.028290185723784222e-02 |
| 2.381593791596242626e-02 | 2.746824860062757612e-02 |
| 3.114628191154560077e-02 | 3.474657394582866821e-02 |

```
           3.816017459557627389e-02  4.127767557484665617e-02
           4.399454265870204189e-02  4.621641942964887367e-02
           4.786405971213982674e-02  4.887756176431913568e-02
           4.921961850792235916e-02  4.887756176430722160e-02
           4.786405971211649124e-02  4.621641943961499799e-02
           4.399454265865893748e-02  4.127767557479596755e-02
           3.816017459551982599e-02  3.474657394576843167e-02
           3.114628191148356012e-02  2.746824860056563955e-02
           2.381593791590233891e-02  2.028290185718109595e-02
           1.694919976045457591e-02  1.387883386739868080e-02
           1.111829204687865558e-02  8.696205471338888313e-03
           6.624050392790052504e-03  4.897754981710309222e-03
           3.500019425521043361e-03  2.403123377130064655e-03
           1.571981036031963076e-03  9.672101423812063574e-04
           5.480050482489367018e-04  2.746422596861784488e-04
           1.104949698301729600e-04 acuson40:
           1.519012613226330152e-04  4.181501626495982707e-04
           8.988893462157706153e-04  1.644283146730663066e-03
           2.763516279318063186e-03  4.328095901842549109e-03
           6.408766584750065845e-03  9.057703996587904496e-03
           1.229984297221085009e-02  1.612530225600011802e-02
           2.048386875682884842e-02  2.528238795303057104e-02
           3.038567808227021771e-02  3.562126298820222914e-02
           4.078783454408990705e-02  4.566695297750748145e-02
           5.003711958631867213e-02  5.368905751867045911e-02
           5.644085148486152614e-02  5.815155286776606258e-02
           5.873196266709863195e-02  5.815155286773562165e-02
           5.644085148480234432e-02  5.368905751858576991e-02
           5.003711958621306216e-02  4.566695297738641163e-02
           4.078783454395933789e-02  3.562126298806819052e-02
           3.038567808213838567e-02  2.528238795290587912e-02
           2.048386875671524138e-02  1.612530225590035754e-02
           1.229984297212648181e-02  9.057703996519322204e-03
           6.408766584696651974e-03  4.328095901802890728e-03
           2.763516279290209599e-03  1.644283146712381466e-03
           8.988893462047787568e-04  4.181501626437783277e-04
           1.519012613201594893e-04 acuson36:
           1.841463290501848269e-04  5.540304138873663889e-04
           1.246545701428789345e-03  2.394976975735786055e-03
           4.138864417939987217e-03  6.608006804320173434e-03
           9.903612013293506058e-03  1.407880277208553230e-02
           1.912116816622149232e-02  2.494016299605368234e-02
           3.136183448270658120e-02  3.813260559722644188e-02
           4.493274735594650050e-02  5.139887411134035772e-02
           5.715349260591249397e-02  6.183851803490583721e-02
           6.514894836050647009e-02  6.686266298108298201e-02
           6.686266298109272421e-02  6.514894836053501670e-02
           6.183851803495114818e-02  5.715349260597138437e-02
           5.139887411140887929e-02  4.493274723602030257e-02
           3.813260559730118071e-02  3.136183448277835017e-02
           2.494016299611927917e-02  1.912116816627864452e-02
           1.407880277213296658e-02  9.903612013330915370e-03
           6.608006804348066053e-03  4.138864417959495917e-03
           2.394976975748419612e-03  1.246545701436198349e-03
           5.540304138911347504e-04  1.841463290516815409e-04 acuson32:
```

A-6

```
              1.737204725936777980e-04   5.812833995089730340e-04
              1.400915672127477129e-03   2.829681627574766583e-03
              5.077058357994755980e-03   8.335578550458327962e-03
              1.274550066849229266e-02   1.835866717914503427e-02
              2.510790004122909203e-02   3.278836281852862133e-02
              4.105612190963931624e-02   4.944675797902139264e-02
              5.741367066422940757e-02   6.438225161935505481e-02
              6.981303954790588073e-02   7.326494447840664614e-02
              7.444909003042916862e-02   7.326494447831148615e-02
              6.981303954772399845e-02   6.438225161910221539e-02
              5.741367066392665669e-02   4.944675797869248213e-02
              4.105612190930778976e-02   3.278836281821534415e-02
              2.510790004095021094e-02   1.835866717891091945e-02
              1.274550066830726532e-02   8.335578550321302155e-03
              5.077058357900466820e-03   2.829681627515332788e-03
              1.400915672094008024e-03   5.812833994929435385e-04 acuson28:
              2.858942897964401246e-04   1.022387959212569001e-03
              2.554742576131113024e-03   5.260349993340006841e-03
              9.501976090210306758e-03   1.554446791309469639e-02
              2.346702883430348135e-02   3.309135130365641053e-02
              4.394603147703285417e-02   5.528238068401954836e-02
              6.146712191016754370e-02   7.550157105861161899e-02
              8.237628184638444429e-02   8.601882378318143063e-02
              8.601882378316888511e-02   8.237628184634830653e-02
              7.550157105855614947e-02   6.146712219094819810e-02
              5.528238068394512178e-02   4.394603147695957945e-02
              3.309135130359010940e-02   2.346702883424810898e-02
              1.554446791305204995e-02   9.501976090180254408e-03
              5.260349993322881515e-03   2.554742576402411081e-03
              1.022387959207576033e-03   2.858942897947524013e-04
```

A-7

Appendix B

```
Jan 9 18:54 1997    spectral.m Page 1 function spectra(x)
%
% spectra(x)
%
% Simulate AR-FFT spectral estimator.
% x = x(:)';                              % Force x to be row vector sun = 1;
p = 4;                                  % Model order
N = 32;
extraN = (128 - N) / 2;
dB = 60;
headroom = -20;
ideal = 0;                              % ideal = 0 => Use hybrid spectrum
                                        %         1 => Use idealized spectrum w = ones(1, 128);

if (sun == 1)
% Sun parameters
    width = 600;
    height = 340;
    xoffset = 290;
    yoffset = 30;
else
% PC parameters
    width = 400;
    height = 160;
    xoffset = 190;
    yborder = 60;
end if (ideal == 1)
    dBFFT = dB;
    dBBurg = dB;
else
    dBFFT = dB;
    dBBurg = dB;
end % High-pass filter input signal
[hpfb, hpfa] = cheby1(2, 0.5, 0.075, 'high');
x = filter(hpfb, hpfa, x);

window1N  = bharris(N)';
window2N  = bharris(2*N)';
window3N  = bharris(3*N)';
window128 = bharris(128)';
window32  = [zeros(1, 48) bharris(32)' zeros(1, 48)];
Npad = (128 - N) / 2;
arpad = zeros(1, (128 - 3*N)/2);
```

```
arwindow3N = [arpad bharris(3*N)' arpad];

Npoints = length(x);
skip = 21;
Nstrip = (Npoints - (128 + 64))/skip
strip = zeros (128, Nstrip);
arstrip = zeros (128, Nstrip);
fftstrip = zeros (128, Nstrip);
idealstrip = zeros (128, Nstrip);

stripindex = 1;
spectraindex = 0;

Nspectra = 0;
for offset = 64:skip:Npoints-64
    Nspectra = Nspectra + 1;            % Update number of spectra computed
    yy = x(offset-(N/2) + (1:N));       % yy = N-point data set centered
                                        % around offset
    zz = x(offset-64+(1:128));          % zz = 128-point data set centered
                                        % about offset
%
% Burg estimator
%
    burgcoeff = ar(burg(yy, p));
    burgcoeff = conj(burgcoeff);        % compute AR coefficients for N-point
                                        % data set
% Compute forward extrapolation of data
    forwextra = zeros(1, extraN);
    delays = yy(length(yy) - p+1: length(yy));
    for k=1:extraN
        forwextra(k) = -burgcoeff * delays(p:-1:1).';
        delays = [delays(2:p) forwextra(k)];
    end
% Compute reverse extrapolation
    backextra = zeros(1, extraN);
    delays = yy(1:p);
    for k=extraN:-1:1
        backextra(k) = -burgcoeff * delays.';
        delays = [backextra(k) delays(1:p-1)];
    end
%
% Plot ideal AR spectrum in cyan
%   pfg(1, [1 burgcoeff], 'c', 'r', -dB);
%   hold on
%
% Plot AR/FFT spectrum
```

B-1

```
%   forward estimates only: yellow
%   forward/backward estimates only: green
pf([backextra yy forwextra] .* window3N, 'y', 'r', -dB)
pf([yy forwextra] .* window2N, 'g', 'r', -dB)

% Plot FFT spectrum in magenta.
pf(yy .* windowN, 'm', 'r', -dB);

% Plot FFT spectrum in red.  Note: This FFT uses four times as much data
pf(zz .* windowl28, 'r', 'r', -dB);

ardata = [backextra yy forwextra] .* windowN;
arstrip(:,stripindex) = 20*log10(w .* abs(fftshift(fft(ardata)))).';
idealstrip(:,stripindex) = -20*log10(abs(fftshift(fft(ardata)))).';

% Conventional FFT estimator using all points
fftarg = zz .* windowl28;
strip(:,stripindex) = 20*log10(w .* abs(fftshift(fft(fftarg))).');
                     % Compute conventional spectrum
                     % using all 128 points.

% Conventional FFT estimator using N points zero-padded to 128 points.
fftarg = zeros(1,128);
fftarg(Npad+1:Npad+N) = yy .* windowN;
                     % Compute conventional spectrum
fftNstrip(:,stripindex) = 20*log10(w .* abs(fftshift(fft(fftarg))).');
stripindex = stripindex+1;
disp(['stripindex = ' num2str(stripindex)]);
spectraindex = spectraindex + 1;
end % Post-process log-compressed strips to allow headroom dB between largest
% value and max log value.  Then, eliminate data that falls below specified
% dynamic range.

tripmax = max(max(strip));
trip = strip - stripmax - headroom;

rstripmax = max(max(arstrip))
rstrip = arstrip - arstripmax - headroom;

dealstripmax = max(max(idealstrip))
```

```
idealstrip = idealstrip - idealstripmax - headroom;
fftstripmax = max(max(fftNstrip))
fftNstrip = fftNstrip - fftstripmax - headroom;

elements = find(strip < -dBFFT);
strip(elements) = zeros(size(elements)) - dBFFT;

elements = find(arstrip < -dBBurg);
arstrip(elements) = zeros(size(elements)) - dBBurg;

elements = find(idealstrip < -dBBurg);
idealstrip(elements) = zeros(size(elements)) - dBBurg;

elements = find(fftNstrip < -dBFFT);
fftNstrip(elements) = zeros(size(elements)) - dBFFT;

hold off
clf
axes('position', [0.1 0.05 0.8 0.2]);
image(strip(:,1:Nspectra)*255/dBFFT + 255);
hold on
a = axis;
plot([a(1) a(2) a(1) a(1)], [a(3) a(3) a(4) a(3)], 'w');
set(gca, 'visible', 'off');
text(0.5, -0.1, '128-point STFT', 'Units', 'normalized', ...
    'HorizontalAlignment', 'center');

axes('position', [0.1 0.30 0.8 0.2]);
image(fftNstrip(:,1:Nspectra)*255/dBFFT + 255);
hold on
a = axis;
plot([a(1) a(2) a(1) a(1)], [a(3) a(3) a(4) a(3)], 'w');
set(gca, 'visible', 'off');
text(0.5, -0.1, '32-point STFT', 'Units', 'normalized', ...
    'HorizontalAlignment', 'center');

axes('position', [0.1 0.55 0.8 0.2]);
image(arstrip(:,1:Nspectra)*255/dBBurg + 255);
hold on
a = axis;
plot([a(1) a(2) a(1) a(1)], [a(3) a(3) a(4) a(3)], 'w');
set(gca, 'visible', 'off');
text(0.5, -0.1, sprintf('%d-point AR-FFT', N), 'Units', 'normalized', ...
    'HorizontalAlignment', 'center');

axes('position', [0.1 0.8 0.8 0.2]);
image(idealstrip(:,1:Nspectra)*255/dBBurg + 255);
hold on
a = axis;
```

B-2

Jan  9 18:54 1997   spectral.m Page 3

```
plot([a(1) a(2) a(2) a(1) a(1)], [a(3) a(3) a(4) a(4) a(3)], 'w');
set(gca, 'Visible', 'off');
text(0.5, -0.1, sprintf('%d-point Ideal AR', K), 'Units', 'normalized', ...
    'HorizontalAlignment', 'center');
colormap(gray(256));
```

B-3

```
function [reflect, rho] = burg(x, p)
x = x(:)';                              % Force x to be 1-D row vector
N = length(x);
r0 = norm(x);
r0 = (r0 * r0);
rho = r0;
forwerr = x;
backerr = x;
denominator = 2 * r0;
mag2 = 0;
reflect = [];

for k = 1:p
   numerator = -2 * forwerr(k+1:N) * backerr(k:N-1)';
   denominator = (1-mag2)*denominator;
   denominator = denominator - norm(forwerr(k))*norm(forwerr(k));
   denominator = denominator - norm(backerr(N))*norm(backerr(N));
   reflect = [reflect numerator/denominator];
   mag2 = norm(reflect(k));
   mag2 = mag2 * mag2;

rho = (1 - mag2) * rho;
   newforwerr(2:N) = forwerr(2:N) + reflect(k) * backerr(1:N-1);
   newbackerr(2:N) = backerr(1:N-1) + conj(reflect(k)) * forwerr(2:N);
   forwerr = newforwerr;
   backerr = newbackerr;
end % function a = AR(k)
%
% Convert reflection coefficients to AR coeffcients.
%       k = reflection coefficients
%       a = AR coefficients
function a = AR(k)
p = length(k);
a(1) = k(1);
lastar = a;
for i = 2:p,
        a(1:i-1) = lastar(1:i-1)+k(i)*conj(lastar(i-1:-1:1));
        a(i) = k(i);
        lastar = a;
end;

function w = bharris(n)
% Return N-point 4-term Blackman Harris window.
omega = 2 * pi * (0:n-1)' / n;
w = .35875 - .48829 * cos(omega) + 0.14128 * cos(2*omega);
w = w - 0.01168 * cos(3*omega);
```

B-4

I claim:

1. An ultrasound apparatus for generating data for a spectral Doppler strip comprising:
   a beamformer with a Doppler data output; and
   a signal processor for generating auto-regressive parameters from Doppler data at said output and for applying a window function to information responsive to said auto-regressive parameters.

2. The apparatus of claim 1 wherein said signal processor comprises an autoregressive parameter estimator implementing an algorithm selected from the group consisting of: Burg, autocorrelation and covariance.

3. The apparatus of claim 1 wherein said signal processor applies a window function selected from the group consisting of: Blackman, Blackman-Harris, Hamming and Acuson; and further comprising a control processor for selecting said window function.

4. The apparatus of claim 1 further comprising a processor for setting a number of Doppler data samples and for setting a window length for said signal processor.

5. The apparatus of claim 1 wherein said signal processor further comprises a spectral estimator for calculating a Fourier transform of an output of said window function.

6. The apparatus of claim 1 wherein said signal processor further comprises an extrapolator responsive to said autoregressive parameters for generating extrapolated data from said Doppler data; wherein said window function generates data responsive to said Doppler data and said extrapolated data.

7. The apparatus of claim 1 further comprising a spectral Doppler strip display.

8. An ultrasound apparatus for generating data for a spectral Doppler strip comprising:
   a beamformer with a Doppler data output; and
   a signal processor for generating extrapolated data from Doppler data at said output and for applying a window function to said extrapolated data.

9. The apparatus of claim 8 wherein said signal processor comprises an autoregressive parameter estimator implementing an algorithm selected from the group consisting of: Burg, autocorrelation and covariance; and wherein said extrapolated data comprises extrapolated data responsive to autoregressive parameters.

10. The apparatus of claim 8 wherein said signal processor applies a window function selected from the group consisting of: Blackman, Blackman-Harris, Hamming and Acuson; and further comprising a control processor for selecting said window function.

11. The apparatus of claim 8 further comprising a processor for setting a number of Doppler data samples and for setting a window length of said window function.

12. The apparatus of claim 8 wherein said signal processor further comprises a spectral estimator for calculating a Fourier transform of an output of said window function.

13. The apparatus of claim 8 further comprising a spectral Doppler strip display.

* * * * *